United States Patent
Caprioli et al.

(10) Patent No.: US 8,041,900 B2
(45) Date of Patent: Oct. 18, 2011

(54) METHOD AND APPARATUS FOR IMPROVING TRANSACTIONAL MEMORY COMMIT LATENCY

(75) Inventors: Paul Caprioli, Santa Clara, CA (US); Martin Karlsson, San Francisco, CA (US); Sherman H. Yip, San Francisco, CA (US)

(73) Assignee: Oracle America, Inc., Redwood Shores, CA (US)

( * ) Notice: Subject to any disclaimer, the term of this patent is extended or adjusted under 35 U.S.C. 154(b) by 593 days.

(21) Appl. No.: 12/014,217

(22) Filed: Jan. 15, 2008

(65) Prior Publication Data

US 2009/0182956 A1 Jul. 16, 2009

(51) Int. Cl.
*G06F 12/08* (2006.01)

(52) U.S. Cl. .................... 711/145; 711/E12.041

(58) Field of Classification Search .................. None
See application file for complete search history.

*Primary Examiner* — Hetul Patel
*Assistant Examiner* — Ryan Dare
(74) *Attorney, Agent, or Firm* — Park, Vaughan, Fleming & Dowler LLP; Anthony P. Jones

(57) ABSTRACT

Embodiments of the present invention provide a system that executes transactions on a processor that supports transactional memory. The system starts by executing the transaction on the processor. During execution of the transactions, the system places stores in a store buffer. In addition, the system sets a stores_encountered indicator when a first store is placed in the store buffer during the transaction. Upon completing the transaction, the system determines if the stores_encountered indicator is set. If so, the system signals a cache to commit the stores placed in the store buffer during the transaction to the cache and then resumes execution of program code following the transaction when the stores have been committed. Otherwise, the system resumes execution of program code following the transaction without signaling the cache.

20 Claims, 2 Drawing Sheets

METHOD AND APPARATUS FOR IMPROVING TRANSACTIONAL MEMORY COMMIT LATENCY

BACKGROUND

1. Field of the Invention

Embodiments of the present invention relate to mechanisms that facilitate transactional memory in computer systems. More specifically, embodiments of the present invention relate to techniques for improving commit latency for transactional memory.

2. Related Art

Some computer systems provide a special mode of execution for critical sections of program code. Generally, a critical section is a special section of the program code that is to be protected against interference from other threads or processors in the computer system. For example, while executing a critical section, the computer system may prevent another thread or processor from accessing cache lines that have been accessed by instructions in the critical section. Depending on the computer system, critical sections can range from single instructions to long, complex sequences of instructions.

In some systems, when executing a critical section, cache lines (or cache structures) accessed by instructions within the critical section are locked to protect the cache lines from interfering access by other threads or processors. Unfortunately, locking cache lines can cause system performance to degrade because other threads or processors that need access to the cache lines must stall, waiting until the execution of the critical section has completed and they can gain access.

To avoid stalling the other threads or processors, computer system designers have proposed executing the critical section as a transaction (i.e., "transactional execution"). When executing a transaction, a processor executes a critical section for a thread, but prevents the results from affecting the architectural state of the system until the entire critical section successfully completes. For example, some systems buffer transactional stores in a store buffer and load-mark and store-mark the cache lines loaded and stored by the transaction. When the transaction successfully completes, the processor atomically commits the results of the transaction for the thread to the architectural state of the system.

In systems that support transactional execution, other threads or processors are permitted limited access to the marked cache lines as the transaction is executing. However, if another thread or processor attempts to perform an interfering access to a marked cache line, the transaction may fail or the system may force the other thread or processor to stall until the transaction is completed.

In an exemplary system, when atomically committing the results of the transaction to the architectural state, the processor signals the L2 cache to lock the store-marked cache lines. The processor then individually commits each buffered store operation to the architectural state of the system (i.e., stores the transactional results in the corresponding cache line in the L2 cache), removes the store-mark from the cache line, and the L2 cache unlocks the cache line. When all the buffered stores have been committed, the processor resumes non-transactional execution for the thread. Committing the transactional results in this way preserves the memory atomicity of the transaction.

Unfortunately, if there were no stores buffered during the transaction, the processor signaling the L2 cache, and the L2 cache searching for the (non-existent) store-marks on cache lines can unnecessarily consume memory system bus bandwidth and cause delay.

Hence, what is needed is a system that does not suffer from the above-described problem.

SUMMARY

Embodiments of the present invention provide a system that executes transactions on a processor that supports transactional memory. The system starts by executing the transaction on the processor. During execution of the transaction, the system places stores in a store buffer. In addition, the system sets a stores_encountered indicator when a first store is placed in the store buffer during the transaction. Upon completing the transaction, the system determines if the stores_encountered indicator is set. If so, the system signals a cache to commit the stores placed in the store buffer during the transaction to the cache and then resumes execution of program code following the transaction when the stores have been committed. Otherwise, the system resumes execution of program code following the transaction without signaling the cache. In this way, the system avoids the resource usage to commit the stores if the system placed no stores in the store buffer during the transaction.

In some embodiments, when signaling the cache to commit the stores, the system sends a TX_DONE signal to the cache and receives a PASS signal from the cache. In these embodiments, when not signaling the cache to commit the stores, the system does not send the TX_DONE signal to the cache, but instead receives the PASS signal directly from the processor.

In some embodiments, when placing each store in the store buffer during the transaction, the system places a store-mark on a corresponding destination cache line.

In some embodiments, upon receiving the signal at the cache, the system locks each cache line that includes a store-mark. The system then receives each store from the store buffer at the cache, completes the store to a corresponding locked cache line, clears the store-mark from the corresponding locked cache line, and unlocks the cache line.

In some embodiments, when commencing the transaction, the system generates a checkpoint that includes sufficient state information to restore a processor state prior to the transaction and clears the stores_encountered indicator.

In some embodiments, the system fails the transaction if another thread or processor performs an interfering access of a store-marked cache line. In these embodiments, when failing the transaction, the system restores the checkpoint and re-executes the transaction zero or more times.

In some embodiments, when resuming execution of the program code following the transaction, the system generates a checkpoint that includes sufficient state information to restore a processor state just prior to an execution of a subsequent program code and executes the subsequent program code in a transaction.

In some embodiments, when resuming execution of the program code following the transaction, the system executes a subsequent portion of the program code non-transactionally.

DETAILED DESCRIPTION

Figure 1:
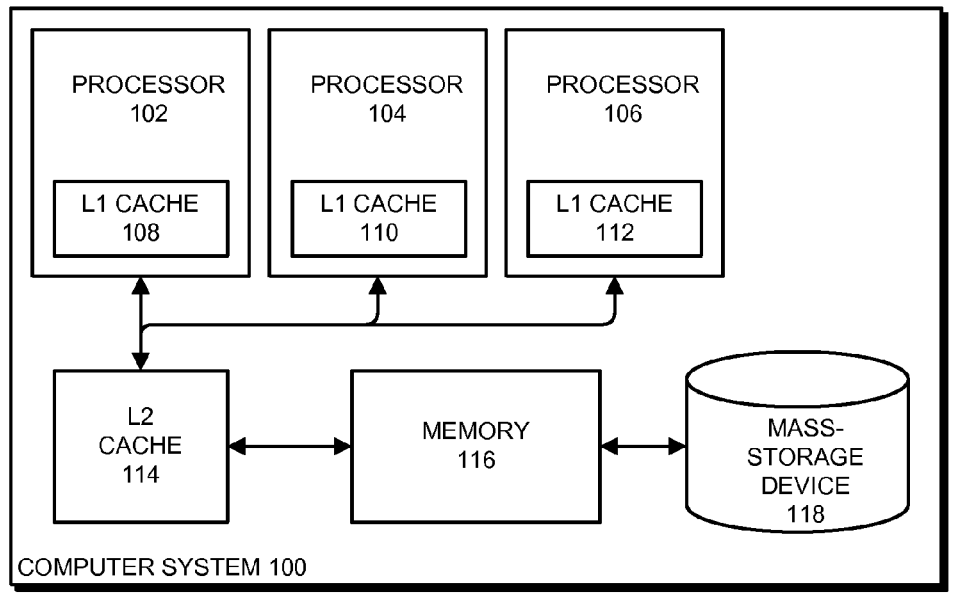
FIG. 1 presents a block diagram of a computer system in accordance with embodiments of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

Embodiments of the present invention provide a processor 102 (see FIG. 2) that improves the latency of a commit operation during transactional execution.

In these embodiments, processor 102 buffers any stores encountered while transactionally executing program code (i.e., during a transaction) and store-marks each buffered store's destination cache line 302 (see FIG. 3) in a corresponding L2 cache 114. The processor also sets stores_encountered indicator 206 when buffering a store during the transaction.

Upon completing the transaction, processor 102 determines if the stores_encountered indicator 206 is set (i.e., if stores were buffered during the transaction). If so, processor 102 sends a TX_DONE signal to L2 cache 114 and awaits a returned PASS signal from the L2 cache. If the L2 cache determines that the transaction has completed successfully from the perspective of the L2 cache (e.g., there were no interfering accesses to cache lines during the transaction), the L2 cache locks the store-marked cache lines and asserts the PASS signal. Otherwise, if the transaction has failed, the L2 cache clears the store-marks from the cache lines and signals the processor that the transaction has failed. Upon receiving the PASS signal, processor 102 commences committing the buffered stores. When the buffered stores have been committed, processor 102 resumes non-transactional execution. Upon receiving a fail signal from the L2 cache, the processor restores a checkpoint and resumes execution (which can involve re-executing the transaction).

On the other hand, if stores_encountered indicator 206 is clear, processor 102 does not send a TX_DONE signal, but instead internally generates the PASS signal and sends the PASS signal directly to a receiver on the processor. Upon detecting the PASS signal at the receiver, processor 102 resumes non-transactional execution. Note that because there are no buffered stores, the PASS signal indicates that the transaction has completed successfully (e.g., no interfering access have occurred), and therefore processor 102 can proceed with execution.

Because the processor internally generates and sends the PASS signal directly to the receiver on the processor when no stores were buffered during the transaction, the processor avoids the needless consumption of memory system bandwidth and delay associated with sending the TX_DONE signal to the cache and awaiting the returned PASS signal.

Transactional Execution

Embodiments of the present invention support transactional execution. Generally, during transactional execution, a processor (e.g., processor 102) executes a critical section of the program code as a transaction for a corresponding thread. (Recall that a critical section is a section of the program code that is to be protected from interference by other threads or processors during execution.) During a transaction, processor 102 buffers transactional results to enable the transactional results to be discarded in the event that another thread or processor interferes with the transaction. Until the transaction is complete, computer system 100 monitors the other thread(s) or processors to determine if another thread or processor has interfered with the transaction. If the transaction completes and no other thread or processor has interfered with the transaction, processor 102 atomically commits the buffered transactional results to the architectural state of computer system 100 and continues execution of the program code following the critical section. Otherwise, the transaction fails and processor 102: (1) deletes the buffered transactional results; (2) restores the pre-transactional state of processor 102; and (3) resumes execution just before the critical section. The following paragraphs describe transactional execution in more detail, while the subsequent sections of this disclosure describe the enhancements of transactional execution in embodiments of the present invention.

Note that although we refer to processor 102 executing a critical section of the program code in a transaction, embodiments of the present invention are not limited to critical sections; other portions of the program code can be transactionally executed using the same principles.

Processor 102 starts by non-transactionally executing program code for a thread. During non-transactional execution, processor 102 encounters the start of transactional execution for a critical section of program code by a thread (i.e., the start of a transaction). In embodiments of the present invention, the start of the transaction is indicated by a special instruction or by a pattern in the program code. For example, a special instruction such as a start transactional execution (STE) instruction or another instruction can function as the indicator of the commencement of a transaction. Alternatively, certain regular instructions (e.g., LOAD instructions), sequences of instructions, method calls, or other portions of the program code can function as the indicator of the commencement of a transaction.

Next, processor 102 generates a checkpoint and commences transactional execution for the thread. Generating the checkpoint involves saving processor 102's precise architectural state to enable the recovery of the architectural state just prior to the start of the transaction. When saving the architectural state, processor 102 saves information required to restart instruction execution at the point in the program code just prior to the transaction commencing. For example, processor 102 can save register values (or register windows, etc.), program counter(s), program stack, and other information useful for restarting execution from the checkpoint.

Processor 102 then transactionally executes the instructions in the critical section for the thread. During the transaction, processor 102 executes instructions in the critical section similarly to how instructions are executed during non-transactional execution. However, upon encountering a load from a cache line, processor 102 loads data from the cache line and places a load-mark on the cache line in L1 cache 108. In addition, upon encountering a store to a cache line 302 (see FIG. 3), processor 102 buffers the store in store buffer (STB) 204 (thereby deferring the store) and places a store-mark 304 on the cache line 302 in L2 cache 114.

Note that buffering stores during the transaction prevents the stores from affecting the architectural state of computer system 100, thereby enabling processor 102 to recover to the checkpoint should the transaction fail. In addition, the load-marks and store-marks placed on accessed cache lines enable computer system 100 to monitor accesses by other threads or processors to the marked cache lines.

During the transaction, other threads or processors are permitted only limited access to marked cache lines. For example, another thread or processor can load from a load-marked cache line. However, in embodiments of the present invention, if another thread or processor attempts to perform an access to a cache line that could result in a return of incorrect data and/or the corruption of data in the cache line with respect to the transactional thread or to any other thread or processor (i.e., an interfering access), processor 102 causes the transaction to fail. In alternative embodiments, upon attempting to make an interfering access, computer system 100 stalls the other thread or processor until the transaction is complete.

In embodiments of the present invention, when the transaction fails, processor 102 restores the checkpoint, thereby restoring the architectural state of processor 102 just prior to the execution of the transaction. Processor 102 then resumes execution for the thread from the restored checkpoint, which can involve re-executing the transaction zero or more times. In some embodiments of the present invention, there is a limit on the number of times that a transaction is re-executed from the checkpoint, assuming repeated failures (e.g., 3 times). After reaching the limit, processor 102 enters a locking mode, wherein processor 102 locks cache lines (or cache structures) while executing the critical section non-transactionally, to ensure the completion of execution of the critical section.

In embodiments of the present invention, if the transaction is successfully completed, processor 102 atomically commits any stores that were buffered during the transaction to the architectural state of computer system 100, thereby making the stored data visible to other threads or processors in computer system 100. (The atomic commitment of transactional results is described in more detail below.) Processor 102 then resumes execution of the program code following the critical section for the thread.

In some embodiments of the present invention, atomically committing the transactionally buffered stores involves locking store-marked cache lines 302 in L2 cache 114, writing each buffered store back to the corresponding locked cache lines 302, and removing the lock from the corresponding locked cache line 302. Note that while the cache lines are locked, no other thread or processor is permitted to access the cache lines. However, when the locks are removed, the cache lines can be accessed by any thread or processor (using an appropriate memory coherency protocol such as the MOESI-type protocol). Hence, with respect to other threads or processors in the system, the buffered stores (i.e., the results of the transaction) appear to be released to computer system 100 atomically. More specifically, there is no time when partial results from the transaction are visible to other threads or processors in the system.

Note that embodiments of the present invention can resume transactional execution or non-transactional execution after the results of the transactional execution are committed. In embodiments that resume transactional execution, results of a transaction are committed and then processor 102 returns to transactional execution. In some embodiments, resuming transactional executions enables a transaction to be halted part-way through a critical section (or between two critical sections), which enables the results to be committed, and the transaction resumed.

Computer System

FIG. 1 presents a block diagram of a computer system 100 in accordance with embodiments of the present invention. Computer system 100 includes processors 102, 104, and 106.

Each processor 102, 104, and 106 is a separate processing unit that performs computational operations. Moreover, each processor 102, 104, and 106 executes instructions for one or more execution threads (or strands). The operation of a processor which executes instructions for threads is known in the art and is therefore not described in more detail.

Processors 102, 104, and 106 include L1 caches 108, 110, and 112, respectively, and the processors share L2 cache 114, memory 116, and mass-storage device 118. Each L1 cache stores data for the corresponding processor, while shared L2 cache 114, memory 116, and mass-storage device 118 can store data for all of the processors. Generally, mass-storage device 118 is a high-capacity memory, such as a disk drive or a large flash memory, with a large access time, while the L1 caches, L2 cache 114, and memory 116 are smaller, faster memories that store copies of frequently used data. Memory 116 is typically a dynamic random access memory (DRAM) structure that is larger than L1 caches or L2 cache 114, whereas the L1 caches and L2 cache 114 are typically comprised of static random access memory (SRAM). Such memory structures are well-known in the art and are therefore not described in more detail.

Although we use processors 102-106 and a set of caches 108-112 and 114 as exemplary components in computer system 100, in alternative embodiments different components can be present in computer system 100. For example, computer system 100 can include video cards, network cards, optical drives, and/or other peripheral devices that are coupled to the one or more of the processors using a bus, a network, or another suitable communication channel.

Figure 2:
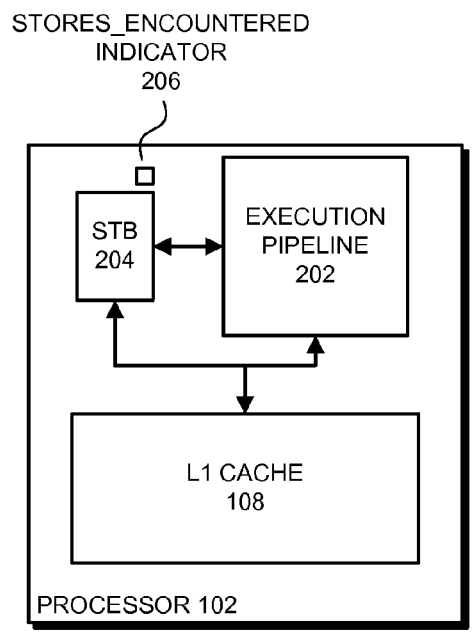
FIG. 2 presents a block diagram of a processor in accordance with embodiments of the present invention.

FIG. 2 presents a block diagram of a processor 102 in accordance with embodiments of the present invention. Processor 102 includes L1 cache 108, execution pipeline 202, and store buffer (STB) 204. In addition, processor 102 includes stores_encountered indicator 206.

Execution pipeline 202 includes circuits for performing computational operations. The circuits are divided into a number of pipeline stages to simplify control and to ensure efficient use of computational resources. Execution pipelines are known in the art and therefore are not described in more detail.

STB 204 is used to buffer stores during transactional execution. The buffered stores are held in STB 204 until the transaction successfully completes. Processor 102 then atomically commits the buffered stores to the architectural state of computer system 100 (i.e., to L1 cache 108, L2 cache 114, and possibly to the memory (not shown)). Note that buffering the stores in STB 204 during the transaction enables processor 102 to prevent the transactional results from being committed to the architectural state of computer system 100 until the transaction successfully completes.

The stores_encountered indicator 206 is a memory location or bit (e.g., a separate register or another such memory location) that stores a value to indicate whether stores have been buffered during a given transaction. Upon commencing a transaction, stores_encountered indicator 206 is cleared. Processor 102 then sets stores_encountered indicator 206 when buffering a store during the transaction.

Figure 3:
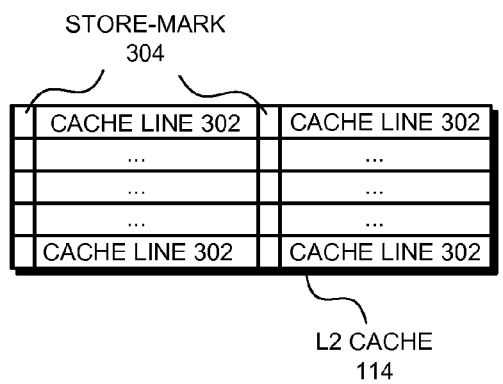
FIG. 3 presents a block diagram of an L2 cache in accordance with embodiments of the present invention.

FIG. 3 presents a block diagram of an L2 cache 114 in accordance with embodiments of the present invention. L2 cache 114 includes a number of cache lines 302 and a store-mark 304 associated with each cache line 302. Cache lines 302 hold cached data, while a store-mark 304 is a type of metadata for the associated cache line 302. When store-mark 304 is set, the associated cache line 302 has been stored to during a transaction. However, if store-mark 304 is cleared, the associated cache line 302 has not been stored to during a transaction. Although not shown in FIG. 3, L2 cache 114 includes a load-mark in the metadata associated with each cache line. Moreover, L1 cache 110 can include both load-marks and/or store-marks for each of a set of cache lines included in L1 cache 110.

Generally, load-marks and store-marks are preferentially placed on cache lines in the cache that is the closest (in terms of access time) to the processor (e.g., processor 102). For example, L1 cache 108 is the closest in terms of access times to processor 102, so marks placed by processor 102 are preferentially placed on cache lines in L1 cache 108, instead of L2 cache 114. However, in some embodiments of the present invention, store-marks 304 are placed on cache lines in L2 cache 114 because, even though L2 cache 114 takes longer to access (i.e., for setting, reading, and removing the store-mark), L2 cache 114 is the most effective location for the marks because the cache lines in L2 cache 114 are loaded from or stored to by the other threads in the system.

Transactional Execution

Figure 4:
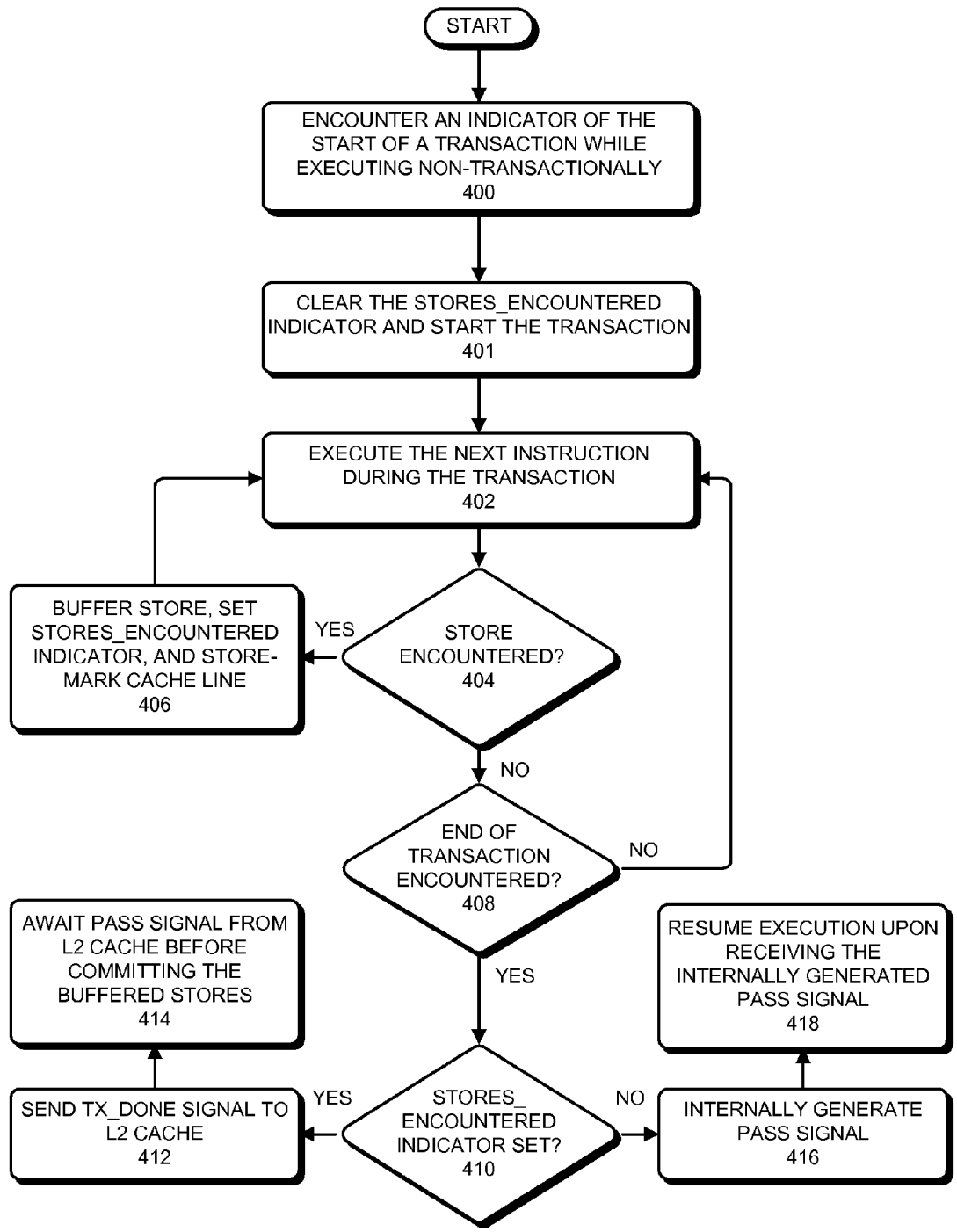
FIG. 4 presents a flowchart illustrating the process of transactionally executing a critical section of the program code in accordance with embodiments of the present invention.

FIG. 4 presents a flowchart illustrating the process of transactionally executing a critical section of the program code in accordance with embodiments of the present invention.

The process starts with processor 102 executing code non-transactionally for a given thread. Processor 102 then encounters an indicator of the commencement of a transaction while executing non-transactionally (step 400). For example, processor 102 could encounter a special instruction that indicates the commencement of a transaction such as the start-transactional-execution (STE) instruction or another instruction. Alternatively, processor 102 could recognize certain regular instructions (e.g., LOAD instructions), sequences of instructions, method calls, or other portions of the program code that have been determined to benefit from transactional execution as the indicator of the commencement of a transaction.

Upon encountering such an indicator, processor 102 clears the stores_encountered indicator 206 and commences the transaction (step 401). As described above, commencing the transaction involves generating a checkpoint, which records the precise architectural state of the processor so that the processor can return to the checkpoint in the event that the transaction fails.

Processor 102 then executes the next instruction during the transaction (step 402). When executing the instruction, processor 102 determines if the instruction is a store (step 404). If so, processor 102 buffers the store, sets the stores_encountered indicator, and store-marks the cache line (step 406). More specifically, processor 102 buffers the store to an available entry in STB 204 (note that the transaction may fail if there are no entries available in STB 204) and places a store mark 304 in the metadata for the cache line 302 that is the destination for the store.

Otherwise, processor 102 determines if the end of the transaction is encountered (step 408). Like the start of the transaction, the end of the transaction can be indicated by a specific instruction such as a COMMIT instruction or another instruction. Alternatively, processor 102 can recognize certain regular instructions, sequences of instructions, method calls, or other portions of the program code that have been determined to end the critical section. If the end of the transaction is not reached, processor 102 returns to step 402 to execute the next instruction during the transaction.

Otherwise, if the end of the transaction has been reached, processor 102 determines if the stores_encountered indicator is set (step 410). If so, the processor starts committing the transactional results to the architectural state of computer system 100. When committing the transactional results to computer system 100, processor 102 sends a TX_DONE signal to L2 cache 114 (step 412). For example, processor 102 can send the TX_DONE signal to a cache controller in L2 cache 114. Processor 102 then awaits the return of a PASS signal from L2 cache 114 before committing the buffered stores (step 414).

Upon receiving the TX_DONE signal, L2 cache 114 determines if an interfering access has occurred during the transaction. For example, L2 cache 114 can determine if another thread has accessed a store-marked cache line. Note that in some embodiments, L2 cache 114 monitors cache line accesses during the transaction and sets an indicator if an interfering access has occurred. In these embodiments, L2 cache 114 reads the indicator to determine if an interfering access has occurred.

If no interfering accesses have occurred, L2 cache 114 locks the store-marked cache lines 302 and asserts a PASS signal to processor 102 to inform processor 102 that the transaction was successful (from the perspective of L2 cache 114) and that the buffered stores can be committed. Locking the store-marked cache lines 302 prevents other threads or processors from accessing the affected cache lines while each transactionally buffered store is written from STB 204 to the destination cache line 302 in L2 cache 114. Processor 102 then commits each buffered store to the architectural state of computer system 100. Specifically, processor 102 completes each buffered store from STB 204 to the corresponding cache line in the L2 cache 114, removes the associated store-mark 304 from the cache line 302, and unlocks the cache line 302. After the buffered stores have been committed, processor 102 resumes execution from the point where transactional execution ended.

Note that embodiments of the present invention can resume transactional execution or non-transactional execution after the buffered stores (i.e., transactional results) have been committed. In embodiments that resume transactional execution, results in a transaction are committed and then processor 102 returns to transactional execution. In some embodiments, resuming transactional executions enables a transaction to be halted part-way through a critical section (or between two critical sections), the results to be committed, and the transaction resumed.

In embodiments of the present invention, if there are no buffered stores (and hence stores_encountered is clear), processor 102 does not send a TX_DONE to L2 cache 114; instead, processor 102 internally generates the PASS signal (step 416). Processor 102 then forwards the internally generated PASS signal to a receiver on processor 102. Next, upon receiving the internally generated PASS signal, processor 102 resumes execution (step 418) (because there are no buffered stores to commit). Because processor 102 resumes execution without sending the TX_DONE signal when no stores were buffered during the transaction, processor 102 avoids the needless consumption of memory system bandwidth and delay associated with sending the TX_DONE signal to the cache and awaiting the returned PASS signal from L2 cache 114.

Note that the for the purpose of illustration, we assume a transaction that completes successfully (i.e., without an interfering access from another process or thread). However, a transaction that fails is handled as described above. More specifically, if the transaction fails, processor 102: (1) discards the buffered stores; (2) restores the checkpoint; and (3) resumes execution from the checkpoint. Resuming execution from the checkpoint can involve re-executing the transaction or executing the critical section non-transactionally (e.g., in a locking mode).

Alternative Embodiments

In embodiments of the present invention, store-marks can be placed in other "levels" of cache (i.e., in other caches) or in memory. For example, store-marks can be placed in an L1 cache 108 or memory 116. These cache levels operate using the same principles as L2 cache 114.

In embodiments of the present invention L2 cache 114 can be split into one or more separate subcaches (or subsections within L2 cache 114). In these embodiments, each separate subcache or subsection of L2 cache 114 operates using the same principles as the above-described embodiments. For example, if there are no transactionally buffered stores for a given subsection of a split L2 cache 114, the TX_DONE signal is not sent to that subsection of L2 cache 114 and the associated PASS signal is generated internally by processor 102.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for executing a transaction on a processor that supports transactional memory, comprising:
    executing the transaction on the processor, wherein stores encountered during the transaction are placed in a store buffer, and wherein a stores_encountered indicator is cleared when commencing the transaction and is set when a first store is placed in the store buffer during the transaction;
    upon completing the transaction, determining if the stores_encountered indicator is set,
    if so, signaling a cache to commit the stores placed in the store buffer during the transaction to the cache and, upon receiving a PASS signal from the cache when the stores have been committed, resuming execution of program code following the transaction;
    otherwise, receiving a PASS signal from an internal mechanism in the processor, wherein the PASS signal is generated in the internal mechanism in the processor without signaling the cache, and resuming execution of program code following the transaction;
    whereby a resource usage to commit the stores is avoided if no stores have been placed in the store buffer during the transaction.

2. The method of claim 1, wherein signaling the cache to commit the stores involves sending a TX_DONE signal to the cache.

3. The method of claim 1, wherein for each store placed in the store buffer during the transaction, the method further comprises placing a store-mark on a corresponding destination cache line.

4. The method of claim 3, wherein the method further comprises:
    upon receiving the signal at the cache, locking each cache line that includes a store-mark;
    upon receiving each store from the store buffer, completing the store to a corresponding locked cache line, clearing the store-mark from the corresponding locked cache line, and unlocking the cache line.

5. The method of claim 1, wherein executing the transaction involves:
    generating a checkpoint that includes sufficient state information to restore a processor state prior to the transaction.

6. The method of claim 5, wherein the method further comprises failing the transaction if another thread or processor performs an interfering access of a store-marked cache line, wherein failing the transaction involves restoring the checkpoint and re-executing the transaction zero or more times.

7. The method of claim 1, wherein resuming execution of the program code following the transaction involves:
    generating a checkpoint that includes sufficient state information to restore a processor state just prior to an execution of a subsequent program code; and
    executing the subsequent program code in a transaction.

8. The method of claim 1, wherein resuming execution of the program code following the transaction involves executing a subsequent portion of the program code non-transactionally.

9. An apparatus for executing a transaction, comprising:
    a processor; and
    a cache coupled to the processor, wherein the cache stores data for the processor;
    wherein the processor is configured to execute the transaction;
    during the transaction, the processor is configured to place any encountered stores in a store buffer, clear a stores_encountered indicator bit when commencing the transaction, and set the stores_encountered indicator bit when a first store is placed in the store buffer;
    upon completing the transaction, the processor is configured to determine if the stores_encountered indicator bit is set,
    if so, the processor is configured to signal the cache to commit the stores placed in the store buffer during the transaction to the cache and, upon receiving a PASS signal from the cache when the stores have been committed, resume execution of program code following the transaction;
    otherwise, the processor is configured to receive a PASS signal from an internal mechanism in the processor, wherein the PASS signal is generated in the internal mechanism in the processor without signaling the cache to commit the stores, and resume execution of program code following the transaction;
    whereby a resource usage to commit the stores is avoided if no stores have been placed in the store buffer during the transaction.

10. The apparatus of claim 9, wherein when signaling the cache to commit the stores, the processor is configured to send a TX_DONE signal to the cache.

11. The apparatus of claim 9, wherein for each store placed in the store buffer during the transaction, the processor is configured to place a store-mark on a corresponding destination cache line.

12. The apparatus of claim 11, wherein the cache is configured to:
    lock each cache line that includes a store-mark in response to the signal from the processor;
    receive each store from the store buffer;
    complete the store to a corresponding locked cache line;
    clear the store-mark from the locked cache line; and
    unlock the cache line.

13. The apparatus of claim 9, wherein when executing the transaction, the processor is configured to:

generate a checkpoint that includes sufficient state information to restore a processor state prior to the transaction.

14. The apparatus of claim 13, wherein the processor is configured to fail the transaction if another thread or processor performs an interfering access of a store-marked cache line, wherein when failing the transaction, the processor is configured to restore the checkpoint and re-execute the transaction zero or more times.

15. The apparatus of claim 9, wherein when resuming execution of the program code following the transaction, the processor is configured to:
generate a checkpoint that includes sufficient state information to restore a processor state just prior to an execution of a subsequent program code; and
execute the subsequent program code in a transaction.

16. The apparatus of claim 9, wherein when resuming execution of the program code following the transaction, the processor is configured to execute a subsequent portion of the program code non-transactionally.

17. A computer system for executing a transaction, comprising:
a processor; and
a cache coupled to the processor, wherein the cache is configured to store data for the processor;
a mass-storage device coupled to the cache, wherein the mass-storage device is configured to store data for the processor;
wherein the processor is configured to execute the transaction;
during the transaction, the processor is configured to place any encountered stores in a store buffer, clear a stores_encountered indicator bit when commencing the transaction, and set the stores_encountered indicator bit when a first store is placed in the store buffer;
upon completing the transaction, the processor is configured to determine if the stores_encountered indicator bit is set,
if so, the processor is configured to signal the cache to commit the stores placed in the store buffer during the transaction to the cache and, upon receiving a PASS signal from the cache when the stores have been committed, resume execution of program code following the transaction;
otherwise, the processor is configured to receive a PASS signal from an internal mechanism in the processor, wherein the PASS signal is generated in the internal mechanism in the processor without signaling the cache, and resume execution of program code following the transaction;
whereby a resource usage to commit the stores is avoided if no stores have been placed in the store buffer during the transaction.

18. The computer system of claim 17, wherein when signaling the cache to commit the stores, the processor is configured to send a TX_DONE signal to the cache.

19. The computer system of claim 17, wherein for each store placed in the store buffer during the transaction, the processor is configured to place a store-mark on a corresponding destination cache line.

20. The computer system of claim 19, wherein the cache is configured to:
lock each cache line that includes a store-mark in response to the signal from the processor;
receive each store from the store buffer;
complete the store to a corresponding locked cache line;
clear the store-mark from the locked cache line; and
unlock the cache line.

* * * * *